United States Patent
Lehtola et al.

(10) Patent No.: US 8,443,108 B2
(45) Date of Patent: May 14, 2013

(54) CENTRALLY CONTROLLED BACKUP FUNCTIONALITY

(75) Inventors: Ari Lehtola, Pirkkala (FI); Tiina Partanen, Tampere (FI); Jouni Rapakko, Kylmäkoski (FI)

(73) Assignee: Nokia Corportion, Espoo (FI)

( * ) Notice: Subject to any disclaimer, the term of this patent is extended or adjusted under 35 U.S.C. 154(b) by 755 days.

(21) Appl. No.: 10/875,079

(22) Filed: Jun. 23, 2004

(65) Prior Publication Data

US 2005/0289195 A1    Dec. 29, 2005

(51) Int. Cl.
*G06F 17/00* (2006.01)
*G06F 7/00* (2006.01)
*G06F 15/16* (2006.01)

(52) U.S. Cl.
USPC .................. 709/248; 707/610; 707/640

(58) Field of Classification Search .................. 709/248, 709/232
See application file for complete search history.

(56) References Cited

U.S. PATENT DOCUMENTS

| | | | |
|---|---|---|---|
| 6,493,758 B1 | 12/2002 | McLain | |
| 6,882,659 B1* | 4/2005 | Novak et al. .................. | 370/466 |
| 7,024,491 B1* | 4/2006 | Hanmann et al. ............. | 709/248 |
| 2003/0184448 A1* | 10/2003 | Kagan ...................... | 340/870.28 |
| 2004/0003031 A1* | 1/2004 | Brown et al. ................. | 709/203 |
| 2004/0219949 A1* | 11/2004 | Su et al. ........................ | 455/558 |
| 2005/0107122 A1 | 5/2005 | Van Reenen et al. | |

FOREIGN PATENT DOCUMENTS

| | | |
|---|---|---|
| EP | 1271885 A2 | 1/2003 |
| GB | 2350973 A | 12/2000 |
| WO | WO 03/03715 A1 | 5/2003 |
| WO | WO 03/037015 A1 | 5/2003 |

OTHER PUBLICATIONS

Megowan, Pat et al. "IrDA Object Exchange Protocol OBEX" Mar. 18, 1999, Version 1.2.*
"Introduction to DTD", Http://www.w3schools.com/dtd/dtd_intro.asp, Jun. 9, 2004, from the Internet.
"Nokia PC Suite: Description", Nokia Connecting People, http://www.nokia.com/nokia/0,,54691,00.html, May 10, 2004, from the Internet.
Infrared Data Association®(IrDA®) Object Exchange Protocol; OBEX™; Version 1.3, Jan. 3, 2003.

* cited by examiner

*Primary Examiner* — Alicia Lewis
(74) *Attorney, Agent, or Firm* — Alston & Bird LLP

(57) ABSTRACT

A method and mobile device are presented for centrally controlling backup functionality, so that parties such as backup devices will efficiently be informed how data content should be backed up from or restored to the mobile device. The mobile device exposes to a party rules for backing up or restoring data content, and those rules are not just for the party, but also are for other parties including the mobile device itself. The rules are contained in a list formatted in extensible markup language (XML). If the party is an external party, the mobile device provides an object exchange protocol (OBEX) capability object in response to the party fetching that object. The OBEX capability object describes capabilities of the mobile device, and is for use by the external party in order to access the list of rules via the mobile device exposing those rules to the external party.

26 Claims, 3 Drawing Sheets

CENTRALLY CONTROLLED BACKUP FUNCTIONALITY

FIELD OF THE INVENTION

The invention relates to backing up data, and more particularly to backing up data from a mobile communication device.

BACKGROUND OF THE INVENTION

The importance of users' data in mobile telephone devices is becoming a great concern of the telecommunications industry, because wireless phones are increasingly being used not just for communication but also for managing personal data. Therefore, backing up this data is an important issue, in order to protect against data loss. Some of this data can be backed up in synchronization with a local personal-computer (PC), or remotely backed up with a synchronisation server located in a network. In case the device is lost or broken, or in case of a hardware (HW) crash, one-way synchronization from the server (or PC) to the phone can be established in order to restore the data. However, data such as documents, or photos taken by a phone's built-in camera, may not be part of a typical synchronization procedure, and they may require traditional backup to be done manually, instead of in a regular and synchronized way. Different types of data need to be backed up at different intervals, and also may require different storage capacities, and therefore a need exists for an efficient system of backing up different types of data to different locations.

Recently, PC "suites" have been developed, in order to provide a package of applications that allow a user to synchronize, edit, and back up many of a phone's files on a compatible PC through a wireless or cable connection. See, for example, Nokia PC Suite: Description, at http://www.nokia.com/nokia/0,,54691,00.html. Since PC suite development has moved application development from a "separate release for each phone" towards a "unified" operation mode, it is now increasingly important to minimize phone-dependent differences. This need for unified functionality includes backup and restore functionality, because there are many variations of locations, amounts, and types of data to be backed up. There also are a number of variations of phone devices having different sets of applications and features (e.g. camera included or not included, differing multimedia capabilities, et cetera), and therefore data content needs to be copied to and from different locations and by following different rules.

Additionally, it is also important to consider a device's ability to be backed up by a removable medium such as a multi media card (MMC). The same backup rules are needed in this MMC case in order to ensure a good user experience. It is not acceptable or efficient for backup instructions to have a different meaning if the device's removable backup/restore application is used instead of a corresponding application on the PC side performing the same backup function.

Traditional device side backups, and also backups taken from the PC side, have not had any coordination with each other, and no coordinated rules about which content to respectively manage, and how to manage content jointly. Instead, each side has had its own "exclude" lists used for blocking out unnecessary content from backup, and this has unfortunately led to the present difficult situation where backups are not necessarily consistent with each other.

It is known in the art to use an Object Exchange Protocol in order to provide a server with synchronization and backup services. See *Infrared Data Association (IrDA) Object Exchange Protocol*, OBEX, Version 1.3 dated Jan. 3, 2003, Section 8.3. However, no way has heretofore been found to use OBEX so as to allow consistent backups to a plurality of backup repositories which respectively back up different categories of data.

SUMMARY OF THE INVENTION

The present invention enables a device to expose rules regarding how the device should be backed up and restored, and these exposed rules are for use by all parties including the device itself. These rules are valid not only for the device's own (e.g. MMC) backup application, but additionally for the PC side backup used via local communication media such as a universal serial bus (USB), Bluetooth (BT), wireless local area network (WLAN), or infrared link (in accordance with the Infrared Data Association IrDA). These rules can additionally be valid for a backup application employing a synchronisation server located in a network.

The device of the present invention comprises a computer readable medium, which stores program codes for providing to an external party a structured list in extensible markup language (XML). The list includes strict rules about how a particular main category of data content should be handled. An external party such as a PC can obtain access to the structured list by fetching a first object that describes capabilities of the device.

This first object is part of the Object Exchange Protocol (OBEX) standard developed by the IrDA, and this first object is called an "OBEX capability object." Various extensions to the OBEX capability object can be defined, including an extension that links to a location of a backup description XML object (backup.xml). This backup description XML object then provides the structured list explaining how data should be backed up from the device. It should be noted that the structure of the backup description XML object is given by a Document Type Definition (DTD). The purpose of a Document Type Definition is to define the allowed building blocks of an XML document; it defines the document structure with a list of allowed elements. Inside of this DTD there are possibilities for making additions for additional content or types of content. The structured list is thus accessible via normal file transfer.

The method, computer program product and mobile device of the present invention thus make it feasible to centrally control backup functionality, so that backup devices will efficiently be informed how data content should be backed up from (and restored to) the mobile device. The device is equipped to provide an object exchange protocol (OBEX) capability object from the mobile device to the backup device. The device then exposes to the backup device a backup description extensible markup language (XML) object in response to a link from an extension of the OBEX capability object.

The present invention is for centrally controlling backup functionality, so that parties such as backup devices will efficiently learn how data content should be backed up from the mobile device, or restored to the mobile device. The mobile device exposes (i.e. shows) to a party various rules for backing up or restoring data content, and those rules are not only for the party, but also are for other parties including the mobile device itself, including all backup devices that interact with the mobile device. The rules are contained in a list formatted in extensible markup language (XML). If the party is an external party, the mobile device provides an object exchange protocol (OBEX) capability object in response to the party fetching that object. The OBEX capability object describes capabilities of the mobile device, and is also for use by the external party in order to access the list of rules via the mobile device exposing those rules to the external party, as discussed previously.

DETAILED DESCRIPTION OF THE INVENTION

Figure 1:
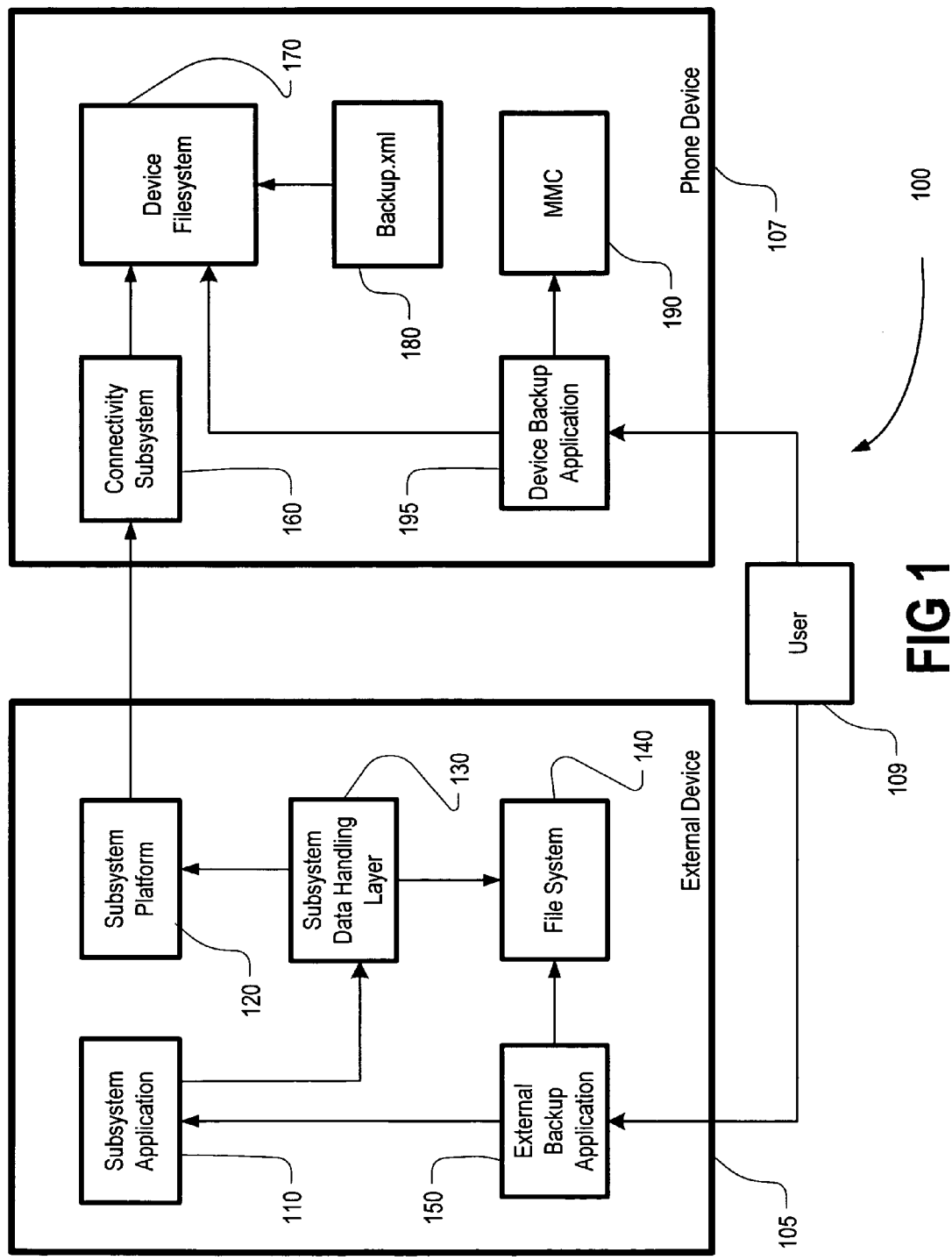
FIG. 1 shows subsystems and components needed for centralized backup handling.

A backup description XML object (backup.xml) containing a list of rules is available by linking from an OBEX capability object that is fetched from a mobile device by a PC, MMC, or network server. The syntax for the capability object is based on XML, and XML has been chosen because of its flexibility and ease with which elements can be categorized and their attributes collected. The capability object is flexible enough that individual manufacturers can selectively include objects, services and attributes that are of interest to them. It also permits the addition of user-defined elements for specific application or manufacturer needs.

The backup description XML object contains categories to be backed up, such as user documents, calendar, contacts, bookmarks, and the like. Categories can be added to the backup description by defining a new version of DTD that describes backup.xml. These categories contain rules to be followed in the respective backup case. These rules are, for example, tags such as "include" or "exclude" or "includeatomic."

Each of these tags indicates folders and/or files belonging to the respective rule. Tags are of "file" type or "folder" type, meaning that the tag takes into account a single file or an entire folder structure, so that a single file or an entire folder is "included" in or "excluded" from the backup. The tag "includeatomic" has a specific purpose: it is used in cases where a folder contains linked files requiring that some of the folder must be handled as whole. In case of restore (as opposed to backup), this "includeatomic" tag means that the whole folder must be emptied before content can be replaced by the old version of the files (e.g. some of the emptied files will not be replaced).

Following is an example of information provided by the backup description XML object that is used for controlling backups.

```
<?xml version="1.0" standalone="yes"?>
<!DOCTYPE BACKUP>
<!ELEMENT BACKUP (CALENDAR?, CONTACTS?, MESSAGES?,
BOOKMARKS?, USER_DATA?,SETTINGS?, FULL?)>
<!ATTLIST BACKUP Version CDATA "1.0">
<!ELEMENT CALENDAR (INCLUDE | INCLUDEATOMIC |
EXCLUDE)+>
<!ELEMENT CONTACTS (INCLUDE | INCLUDEATOMIC |
EXCLUDE)+>
<!ELEMENT MESSAGES (INCLUDE | INCLUDEATOMIC |
EXCLUDE)+>
<!ELEMENT BOOKMARKS (INCLUDE | INCLUDEATOMIC |
EXCLUDE)+>
<!ELEMENT USER_DATA (INCLUDE | INCLUDEATOMIC |
EXCLUDE)+>
```

-continued

```
<!ELEMENT SETTINGS (INCLUDE | INCLUDEATOMIC |
EXCLUDE)+>
<!ELEMENT FULL (INCLUDE | INCLUDEATOMIC | EXCLUDE)+>
<!ELEMENT INCLUDE (FOLDER | FILE)+>
<!ELEMENT INCLUDEATOMIC (FOLDER | FILE)+>
<!ELEMENT EXCLUDE (FOLDER | FILE)+>
<!ELEMENT FOLDER (#PCDATA)>
<!ELEMENT FILE (#PCDATA)>
]>
<BACKUP Version="1.0">
<CALENDAR>
    <INCLUDE>
        <FILE>C:\System\Data\Calendar</FILE>
    </INCLUDE>
</CALENDAR>
<CONTACTS>
    <INCLUDE>
        <FILE>C:\System\Data\Contacts.cdb</FILE>
    </INCLUDE>
</CONTACTS>
<MESSAGES>
    <INCLUDEATOMIC>
        <FOLDER>C:\System\Mail\</FOLDER>
    </INCLUDEATOMIC>
</MESSAGES>
<BOOKMARKS>
    <INCLUDE>
        <FILE>C:\System\Data\Bookmarks1.db</FILE>
    </INCLUDE>
</BOOKMARKS>
<USER_DATA>
    <INCLUDE>
        <FOLDER>C:\Nokia\</FOLDER>
        <FOLDER>E:\</FOLDER>
    </INCLUDE>
    <EXCLUDE>
        <FOLDER>E:\System\</FOLDER>
    </EXCLUDE>
</USER_DATA>
<SETTINGS>
    <INCLUDE>
        <FOLDER>C:\System\Data\Profiles\</FOLDER>
        <FILE>C:\System\Data\Cdbv3.dat</FILE>
    </INCLUDE>
</SETTINGS>
<FULL>
    <INCLUDE>
        <FOLDER>C:\</FOLDER>
        <FOLDER>E:\</FOLDER>
    </INCLUDE>
    <EXCLUDE>
        <FOLDER>D:\</FOLDER>
        <FOLDER>C:\System\temp\</FOLDER>
        <FOLDER>E:\System\temp\</FOLDER>
        <FOLDER>C:\System\midp\</FOLDER>
        <FOLDER>E:\System\midp\</FOLDER>
        <FOLDER>C:\System\sounds\digital\</FOLDER>
        <FOLDER>E:\System\sounds\digital\</FOLDER>
        <FOLDER>C:\System\sounds\simple\</FOLDER>
        <FOLDER>E:\System\sounds\simple\</FOLDER>
        <FOLDER>C:\System\apps\phone\oplogo\</FOLDER>
        <FOLDER>E:\System\apps\phone\oplogo\</FOLDER>
        <FILE>C:\System\shareddata\reserve.bin</FILE>
        <FOLDER>C:\System\data\voucherdb</FOLDER>
        <FOLDER>E:\System\data\voucherdb</FOLDER>
        <FOLDER>C:\System\data\backupvdb</FOLDER>
        <FOLDER>E:\System\data\backupvdb</FOLDER>
        <FOLDER>E:\Images_temp</FOLDER>
    </EXCLUDE>
</FULL>
</BACKUP>
```

This approach to backing up mobile device data has the big advantage of having consistent functionality. This XML object can either be preprogrammed, or it can modified by a user. In either case, the user experience will be enhanced by ensuring reliable backups of user data, with the user data being backed up to a plurality of external backup areas in a coordinated fashion.

Implementation of this embodiment of the invention can be better appreciated by referring to FIG. 1, which shows subsystems and components of a centralized backup 100. A user 109 has access to an external device 105 such as a personal computer (PC), and also has access to a phone device 107.

The external device 105 includes a subsystem application 110 which contains applications running in the external device 105. A backup application receives static information regarding a connected phone 107 that is unavailable in the backup.xml list of rules 180 or in the OBEX capability object. The subsystem platform 120 implements connectivity and protocol-specific parts. A subsystem data handling layer 130 is an abstraction layer of the application data; it communicates to the phone 107 via the subsystem platform 120 using protocols that the platform 120 implements. A file system 140 provides mass memory that is used for file storage. The external backup application 150 contains logic for decoding backup rules that are exposed by the phone device 107. This external backup application 150 has a human interface enabling the user 109 to control backup/restore functionality, and the external backup application 150 uses the file storage provided by the file system 140.

Turning now to the phone device 107, this entity includes a connectivity subsystem 160 that is substantially similar to the subsystem platform 120 on the external side. Likewise, a device file system 170 in the phone device is substantially similar to the file system 140 on the external (e.g. PC) side. The backup.xml 180 is an object containing rules in XML form. The MMC 190 is a multi media card that provides removable mass memory, and extends the device file system 140. Finally, the device backup application 195 corresponds to the external backup application 150 on the external side, and it stores backup on the MMC 190.

Figure 2:
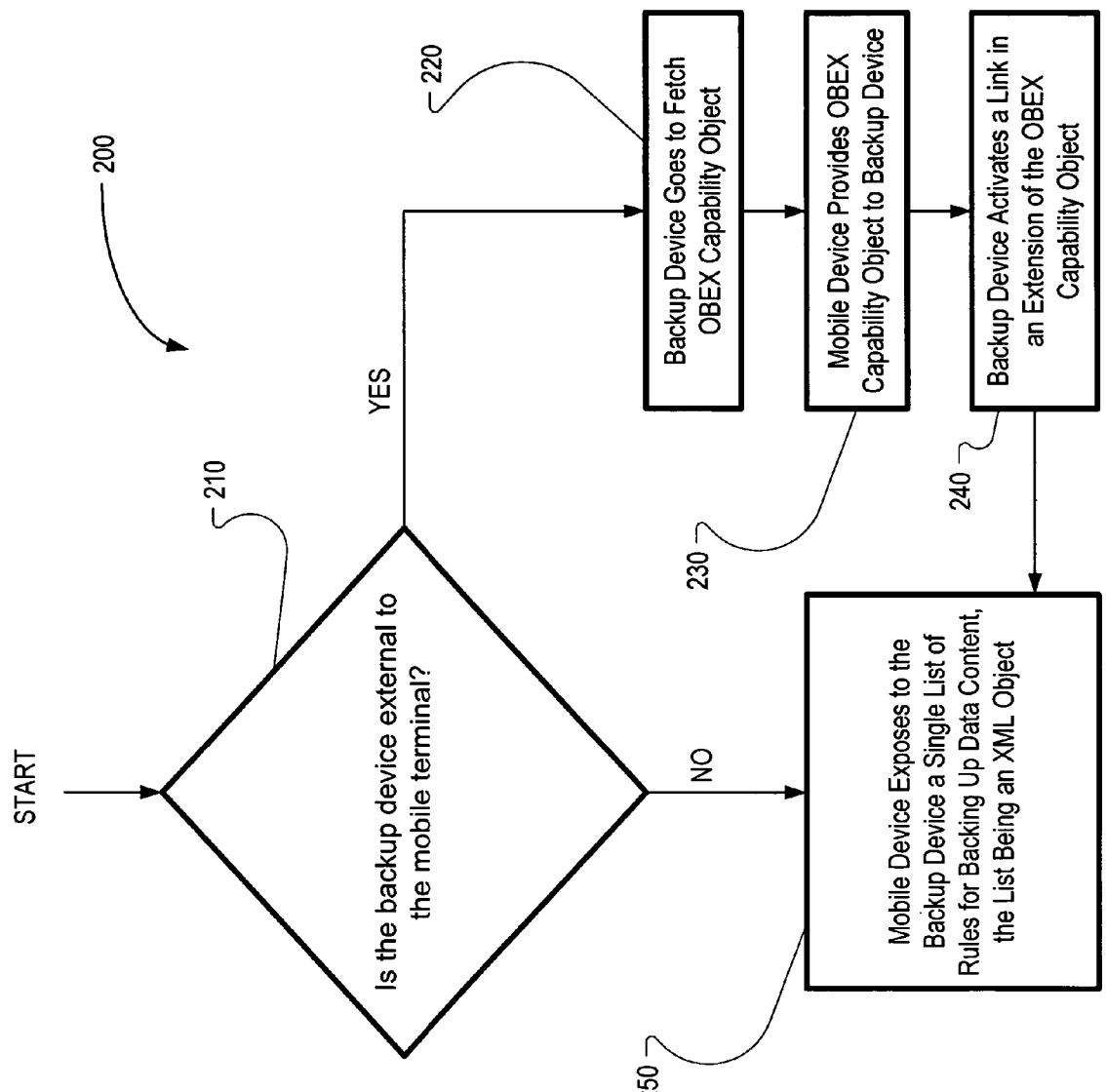
FIG. 2 shows a method according to an embodiment of the present invention.

FIG. 2 is a flow chart showing a method 200 according to the present invention. First, it is determined 210 if the backup device is external to the mobile terminal (i.e. outside the mobile device). If not, then the mobile device directly exposes 250 the list of backup rules to the backup device within the mobile terminal. This single list is also to be exposed to external backup devices. Of course, although this is a single list, the different backup devices can utilize different parts of the list, given the different requirements and capabilities of each backup device. If the question 210 is answered positively, then the backup device will go fetch 220 the OBEX capability object from the mobile device. Then, the mobile device will provide 230 the OBEX capability object. The backup device will then, in this embodiment, activate 240 a link in an extension of the OBEX capability object, and this will cause the mobile device to expose 250 the list of backup and/or restore rules to the backup device.

Figure 3:
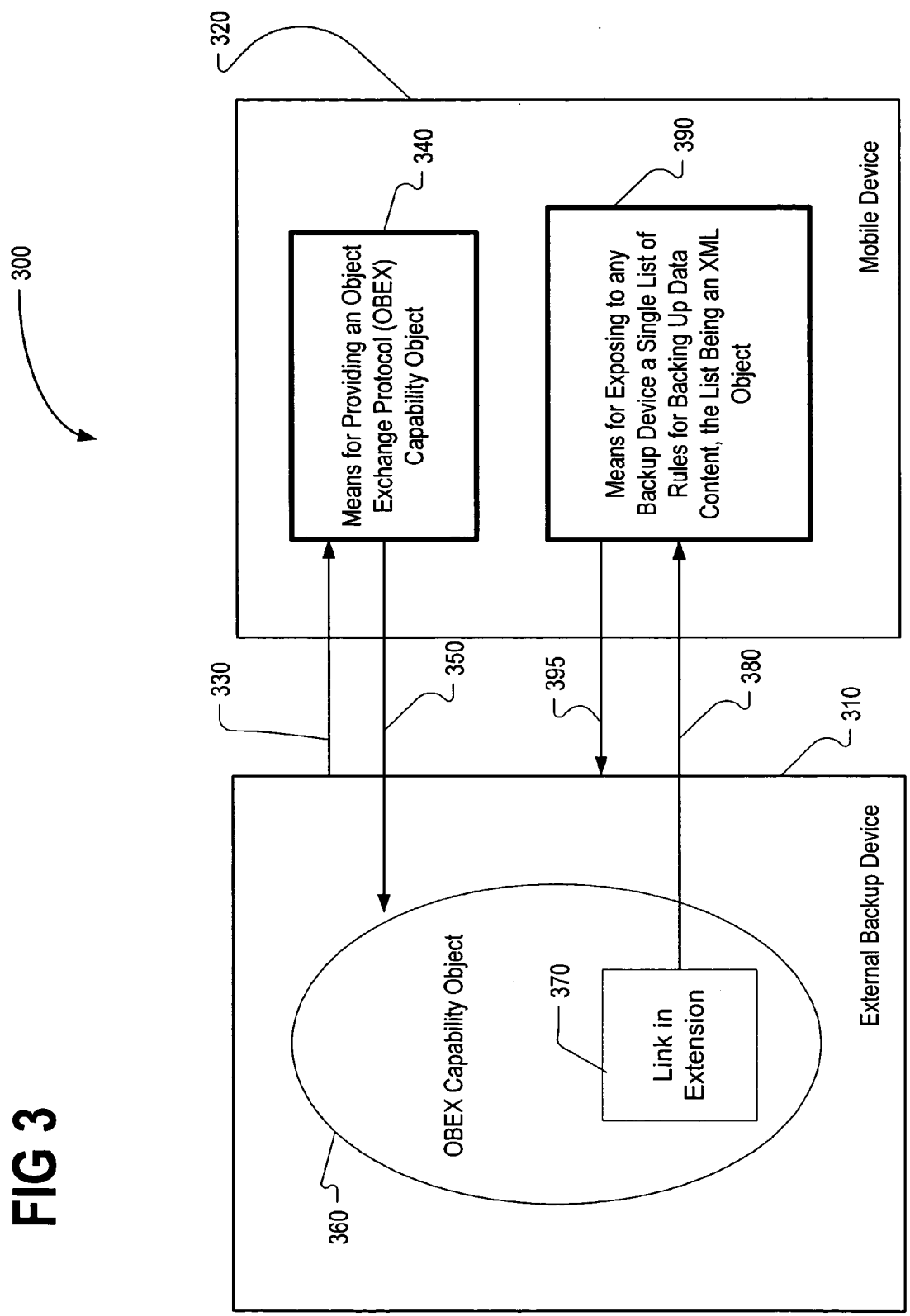
FIG. 3 shows a block diagram of an embodiment of the present invention.

FIG. 3 shows system 300 corresponding to part of the method just described. The external backup device 310 will send a fetch signal 330 to the mobile device 320, and in particular this signal will be received by a means 340 for providing an OBEX capability object. This means 340 will respond by providing on a line 350 the OBEX capability object 360. The external backup device 310 will then activate a link located in an extension 370 of the OBEX capability object 360, and the extension 370 will consequently send an expose request signal 380 to the mobile device 320, and in particular to a means 390 for exposing to any backup device a list of backup rules. In response, the means 390 will then send an expose signal 395 to the external backup device in order to provide the uniform centralized backup rules to the backup device 310.

It is to be understood that the present figures, and the accompanying narrative discussions of best mode embodiments, are illustrative of the present invention, and are not purported to be completely rigorous treatments of the invention under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software, in various configurations and sequences, consistent with the spirit and scope of the present invention, and need not be further detailed herein.

What is claimed is:

1. A method, comprising:
   receiving, from an external party, a request for rules regarding how a plurality of different categories of data content of a mobile device should be backed up or restored, wherein said rules are included in a list formatted in extensible markup language (XML), wherein said list has a document type definition structure that includes the plurality of different categories of the data content, wherein said list also accommodates additions for additional categories of the data content, and wherein said list provides backup rules that are followed in each of the plurality of different categories respectively;
   providing an exchange protocol capability object from the mobile device to the external party in response to the request for rules, wherein said capability object comprises a link located in an extension element of the capability object, wherein said link is configured for activation by said external party, and wherein said extension links to a location of a backup description XML object, said backup description XML object comprising said list of rules;
   activating said link in the extension of the capability object by the external party;
   providing from the mobile device said list of rules to said external party in response to activation of said link by said external party, and
   providing from the mobile device said data content to be backed up, or accepting said data content to be restored, according to said rules,
   wherein said rules for backing up and restoring the plurality of different categories of data content are rules for both the external party and also for other parties including the mobile device itself, and including all backup devices that interact with the mobile device;
   wherein the capability object is used by the external party and by other backup devices that interact with the mobile device, in order to access said list that includes said rules, and
   wherein said backup devices include repositories for backing up different respective categories of data.

2. The method of claim 1, wherein the external party is a backup device.

3. The method of claim 1, wherein a list for a removable backup device that is removable from the mobile device comprises the list provided to the external party.

4. The method of claim 1, wherein the capability object provided by the mobile device is identical for at least one other party.

5. The method of claim 1, wherein the party is a medium removable from the mobile device, or is a personal computer, or is a synchronization server in a network.

6. The method of claim 4, wherein the capability object provided by the mobile device is identical for every other party.

7. The method of claim 5, wherein the medium is a multimedia card.

8. The method of claim 5, wherein if the party is the personal computer, then the backup occurs via a local communication medium.

9. The method of claim 8, wherein the local communication medium is a universal serial bus, bluetooth, wireless local area network, or infrared link.

10. The method of claim 1,
wherein said data content that is provided to or accepted from at least one of said other backup devices is in a different category of data compared to said data content that is provided to or accepted from said party, and
wherein said mobile device has a component that backs up at least part of said data content according to said rules.

11. An apparatus, comprising:
means for receiving a request for rules regarding how a plurality of different categories of data content of a mobile device should be backed up or restored, wherein said rules are included in a list formatted in extensible markup language (XML), wherein said list has a document type definition structure that includes the plurality of different categories of the data content, wherein said list also accommodates additions for additional categories of the data content, and wherein said list provides backup rules that are followed in each of the plurality of different categories respectively;
means for providing an exchange protocol capability object from the apparatus to an external party in response to the request for rules, wherein said capability object comprises a link located in an extension element of the capability object, and said link is configured for activation by said external party, and wherein said extension links to a location of a backup description XML object, said backup description XML object comprising said list of rules;
means for activating said link in the extension of the capability object by the external party;
means for providing said list to said external party in response to activation of said link by said external party, and
means for providing said data content to be backed up, or for accepting said data content to be restored, according to said rules,
wherein said rules for backing up and restoring the plurality of different categories of data content are rules for both the external party and also for other parties including the mobile device itself, and including all backup devices that interact with the mobile device;
wherein the capability object is used by said external party and by other backup devices that interact with said apparatus, in order to access said list that includes said rules; and
wherein said backup devices include repositories for backing up different respective categories of data.

12. The apparatus of claim 11, wherein the external party is a backup device.

13. The apparatus of claim 11, wherein the list exposed to the party is identical for a removable backup device that is removable from the apparatus.

14. The apparatus of claim 11, wherein the capability object provided by the apparatus is identical for at least one other party.

15. The apparatus of claim 11, wherein the party is a medium removable from the apparatus, or is a personal computer, or is a synchronization server in a network.

16. The apparatus of claim 14, wherein the capability object provided by the apparatus is identical for every other party.

17. The apparatus of claim 15, wherein the medium is a multi-media card.

18. The apparatus of claim 15, wherein if the party is the personal computer, then the backup occurs via a local communication medium.

19. The apparatus of claim 18, wherein the local communication medium is a universal serial bus, bluetooth, wireless local area network, or infrared link.

20. A system, comprising:
a mobile device and an external device in communication with the mobile device;
wherein the external device is configured to provide a fetch signal requesting rules regarding how a plurality of different categories of data content of a mobile device should be backed up or restored, wherein said rules are included in a list formatted in extensible markup language (XML), wherein said list has a document type definition structure that includes the plurality of different categories of the data content, wherein said list also accommodates additions for additional categories of the data content, and wherein said list provides backup rules that are followed in each of the plurality of different categories respectively,
and in response to the fetch signal, the mobile device is configured to provide to the external device an exchange protocol capability object, wherein said capability object comprises a link located in an extension element of the capability object, and wherein said link is configured for activation by said external party, and wherein said extension links to a location of a backup description XML object, said backup description XML object comprising said list of rules, and wherein the mobile device is further configured to activate said link in the extension of the capability object by the external party;
wherein said external device activates said link in the extension of the capability object;
wherein the mobile device is further configured to provide to the external device the list of rules in response to activation of said link by said external device and to provide said data content to be backed up, or to accept said data content to be restored, according to said rules,
wherein said rules for backing up and restoring the plurality of different categories of data content are rules for both the external device and also for other parties including the mobile device itself, and including all backup devices that interact with the mobile device;
wherein said external device is further configured to backup different respective categories of data content of the mobile device according to said rules, and
wherein the capability object is used by said external device and by other backup devices that interact with said mobile device, in order to access said list that includes said rules.

21. An apparatus, comprising:
a connectivity subsystem configured to receive a request for rules regarding how a plurality of different categories of data content of a mobile device should be backed up or restored, wherein said rules are included in a list formatted in extensible markup language (XML), wherein said list has a document type definition structure that includes the plurality of different categories of the data content, wherein said list also accommodates additions for additional categories of the data content, and wherein said list provides backup rules that are followed in each of the plurality of different categories respectively;

a backup application processor, configured to provide an exchange protocol capability object from the apparatus to the external party in response to the request for rules, wherein said capability object comprises a link located in an extension element of said capability object, and wherein said link is configured for activation by said external party, and wherein said extension links to a location of a backup description XML object, said backup description XML object comprising said list of rules; and wherein said external party is configured to activate said link in the extension of the capability object, wherein said connectivity subsystem, is further to provide said list of rules to said external party in response to activation of said link by said external party and to provide said data content to be backed up, or to accept said data content to be restored, according to said rules, wherein said rules for backing up and restoring the plurality of different categories of data content are rules for both the external party and also for other parties including the mobile device itself, and including all backup devices that interact with the mobile device;

wherein the capability object is used by the external party and by other backup devices that interact with the apparatus, in order to access said list that includes said rules, and wherein said backup devices include repositories for backing up different respective categories of data.

22. The apparatus of claim 21, wherein the external party is a backup device.

23. The apparatus of claim 21, wherein the list exposed to the party is identical for a removable backup device that is removable from the apparatus.

24. A method, comprising:
providing a fetch signal to a mobile device requesting rules regarding how a plurality of different categories of data content of a mobile device should be backed up or restored, wherein said rules are included in a list formatted in extensible markup language (XML), wherein said list has a document type definition structure that includes the plurality of different categories of the data content, wherein said list also accommodates additions for additional categories of the data content, and wherein said list provides backup rules that are followed in each of the plurality of different categories respectively;

receiving an exchange protocol capability object from the mobile device, said capability object being provided by said mobile device in response to said fetch signal, wherein said capability object comprises a link located in an extension element of the capability object, wherein said link is configured for activation by a backup device, and wherein said extension links to a location of a backup description XML object, said backup description XML object comprising said list of rules;

activating said link in the extension of the capability object in order to fetch from the mobile device said list that includes said list of rules;

receiving from the mobile device said list of rules in response to said activation of said link;

receiving from the mobile device said data content to be backed up or restored according to said rules; and backing up different respective categories of data content of the mobile device according to said rules, wherein said rules for backing up and restoring the plurality of different categories of data content are rules for both an external party and also for other parties including the mobile device itself, and including all backup devices that interact with the mobile device, wherein the capability object is used by the external party and by other backup devices that interact with the mobile device, in order to access said list that includes said rules.

25. An apparatus, comprising:
means for providing a fetch signal to a mobile device requesting rules regarding how a plurality of different categories of data content of a mobile device should be backed up or restored, wherein said rules are included in a list formatted in extensible markup language (XML), wherein said list has a document type definition structure that includes the plurality of different categories of the data content, wherein said list also accommodates additions for additional categories of the data content, and wherein said list provides backup rules that are followed in each of the plurality of different categories respectively;

means for receiving an exchange protocol capability object from the mobile device, said capability object being provided by said mobile device in response to said fetch signal, wherein said capability object comprises a link located in an extension element of the capability object, wherein said link is configured for activation by said apparatus, and wherein said extension links to a location of a backup description XML object, said backup description XML object comprising said list of rules;

means for activating said link in the extension of the capability object in order to fetch from the mobile device said list that includes said rules;

means for receiving from the mobile device said list of rules in response to said activation of said link;

means for receiving from the mobile device said data content to be backed up or restored according to said rules; and means for backing up different respective categories of data content of the mobile device according to said rules, wherein said rules for backing up and restoring the plurality of different categories of data content are rules for both an external party and also for other parties including the mobile device itself, and including all backup devices that interact with the mobile device, and wherein the capability object is used by the external party and by other backup devices that interact with the mobile device, in order to access said list that includes said rules.

26. An apparatus, comprising:
a connectivity subsystem in communication with a mobile device, a backup application processor, and a data storage medium, wherein the connectivity subsystem is configured to provide a fetch signal to the mobile device requesting rules regarding how a plurality of different categories of data content of a mobile device should be backed up or restored, wherein said rules are included in a list formatted in extensible markup language (XML), wherein said list has a document type definition structure that includes the plurality of different categories of the data content, wherein said list also accommodates additions for additional categories of the data content, and wherein said list provides backup rules that are followed in each of the plurality of different categories respectively;

wherein the connectivity subsystem is configured to receive an exchange protocol capability object from the mobile device in response to the fetch signal, wherein said exchange protocol capability object comprises a link located in an extension element of said capability object, and wherein said link is configured for activation by said backup application processor, and wherein said extension links to a location of a backup description XML object, said backup description XML object comprising said list of rules;

wherein the backup application processor is configured to activate said link in the extension of the capability object in order to fetch from the mobile device said list;

wherein the backup application processor is configured to receive from the mobile device said list of rules in response to said activation of said link and to receive from the mobile device said data content to be backed up or restored according to said rules;

wherein said rules for backing up and restoring the plurality of different categories of data content are rules for both an external party and also for other parties including the mobile device itself, and including all backup devices that interact with the mobile device, and wherein the capability object is used by the external party and by other backup devices that interact with the mobile device, in order to access said list that includes said rules, and wherein the data storage medium is configured to backup said plurality of different respective categories of data content of the mobile device according to said rules.

* * * * *